Patented Apr. 14, 1942

2,279,752

UNITED STATES PATENT OFFICE 2,279,752

POLYMERIC MATERIAL

Ralph A. Jacobson, Landenberg, Pa., assignor to E. I. du Pont de Nemours & Company, Wilmington, Del., a corporation of Delaware No Drawing. Application September 25, 1939, Serial No. 296,493

6 Claims. (Cl. 260—78)

This invention relates to polymeric materials and more particularly to new polyamides.

This case is a continuation in part of my Patent 2,176,074, describing polyamide-forming reactants which are of the general type described in Patents 2,071,250, 2,071,253 and 2,130,523 but which are distinguished by the presence of certain lateral substituents in the chain of atoms separating the amide-forming groups, e. g. the amino or carboxyl groups. The polyamides thus obtained differ markedly in many respects from the high-melting, relatively insoluble, crystalline fiber-forming polyamides obtained in accordance with the mentioned patents by polymerizing amino acids not containing a lateral substituent or by reacting a diamine with a dibasic acid neither of which contains such substituent. This invention is concerned with those particular polyamides obtained from those reactants described in the above-mentioned application which contain as the lateral substituent oxygen as a member of a carbonyl group.

This invention has as an object the preparation of polyamides containing a substituent by means of which the properties of the polyamide can be altered through chemical reaction. A further object is the preparation of new and useful polymeric products. A still further object is the manufacture of products useful in the textile, plastic, molding, coating, sizing, adhesive impregnating, and related arts. Other objects will appear hereinafter.

These objects are accomplished by heating to reaction temperature, generally from 100 to 300° C., in the presence or absence of a solvent or diluent, a polyamide-forming composition containing at least one reactant which contains a ketone group in the chain of atoms separating the amide-forming groups of said reactant until a polymeric product is obtained.

The polyamide-forming composition may consist of an amino acid or an amide-forming derivative thereof, or it may consist of a mixture of a diamine and a dicarboxylic acid or an amide-forming derivative of a dibasic carboxylic acid. It may also consist of mixtures of these reactants. By "amide-forming derivative of an acid" is meant an ester, acyl halide, amide, anhydride, or nitrile.

Thus the polyamide-forming composition may be a polymerizable monoaminomonocarboxylic acid of the formula NH$_2$RCOOH, or its amide-forming derivatives, in which R is a divalent organic radical having a chain of atoms at least one of which is the carbon atom of a ketone group, or the reactants may be a mixture of a diamine of the formula NH$_2$R'NH$_2$ with a dibasic acid of the formula HOOCR''COOH or its amide-forming derivatives, R' and R'' in the formulae being divalent organic radicals at least one of which has a chain of atoms in which at least one is the carbon atom of a ketone group.

In carrying out my invention either a polymerizable monoaminomonocarboxylic acid (including amide-forming derivatives thereof) containing a ketone group, or substantially chemically equivalent amounts of a diamine (primary or secondary) and a dibasic acid (preferably as the salt of the diamine and dibasic acid) or amide-forming derivative of a dibasic carboxylic acid, at least one of which contains a ketone group, are heated to reaction temperature (generally 100–300° C. and preferably 150–280° C.) in an open or closed reactor under ordinary, reduced or increased pressure, preferably in the absence of oxygen, until a polymer of the desired properties is formed. Reaction may also be carried out in the presence of a solvent, a diluent which is a nonsolvent for the polymer, or a mixture of solvent and diluent. The reaction generally involves the removal of a by-product, e. g. water, alcohol, phenol, hydrogen chloride or ammonia, depending upon the amide-forming derivative of the acid used. Unless the by-product is a phenol, the by-product should be removed from the reacting mass if a fiber-forming product is desired.

The following examples, in which parts are given by weight, illustrate the preparation of typical products of this invention.

Example I

*Polyamide from phoronic acid and decamethylenediamine.*—An ethanol solution of 25 parts of phoronic acid,

(HOOC)C(CH$_3$)$_2$CH$_2$COCH$_2$C(CH$_3$)$_2$(CO$_2$H)

was added to an ethanol solution of 18.8 parts of decamethylenediamine. This caused the precipitation of the diamine-dibasic acid salt. The air-dried salt was heated for one hour at 215–225° C. under atmospheric pressure, and then for 2 hours under reduced pressure (2 mm.). The polyamide thus formed was a clear, light-amber-colored resin, soluble in benezene, butyl acetate, ethanol, dioxan, and the ethyl ether of ethylene glycol. It softened at about 45° C. Films cast on glass from solutions of the resin were clear, tough, and had good adhesion.

Example II

*Polyamides from ethyl acetonedicarboxylate and decamethylenediamine.*—Decamethylenediamine (85 parts) and 100 parts of the diethyl ester of acetonedicarboxylic acid, $$C_2H_5O-OCCH_2COCH_2COOC_2H_5$$

were heated together as follows: 130° C./760 mm., 20 minutes; 130–190° C./760 mm., 40 minutes; 190° C./20 mm., 30 minutes. At the end of this time the reaction mixture gelled but was still soluble in a mixture of approximately equal volumes of ethanol and benzene. The resulting polyamide was a tough horn-like, amber-colored resin. It had a softening point (penetrometric) of about 30° C. Films formed by drying an alcohol-benzene solution of the polyamide at room temperature were very hard and tough.

Example III

*Polyamide from thioglycolic acid, phorone, and decamethylenediamine.*—Phorone (13.8 parts) and thioglycolic acid (29.3 parts) were mixed and allowed to stand about 3 weeks at room temperature, heated 8 hours on the steam bath, and finally heated under 2 mm. absolute pressure at 165° C. to remove any unreacted materials. The product (bisthioglycolic acid ether of phorone) was a heavy syrup. It was formed by the addition of 2 moles of acid to one of phorone and probably has the structure $$HOOCCH_2SC(CH_3)_2CH_2COCH_2C(CH_3)_2SCH_2COOH$$

This material (19 parts) was heated with 10.6 parts of decamethylenediamine for 1.5 hours at 215–220° C. The resulting polyamide was a reddish-brown resin which was soluble in butyl acetate, ethanol-benzene mixtures, and in the ethyl ether of ethylene glycol. It was plastic at room temperature, but was useful in coating compositions.

Example IV

*Polyamide from 4-ketopimelic acid and triglycoldiamine.*—The salt of 4-ketopimelic acid and triglycoldiamine was prepared by mixing equivalent quantities of the two materials in absolute alcohol. The salt which precipitated was separated and heated under nitrogen in a sealed tube at 250° C. for 1.5 hours. It was heated for a like period at 250° C. at atmospheric pressure and for 0.5 hour at 250° C. under 5 mm. absolute pressure. The resulting polymer was quite water-sensitive and was able to absorb 120% of its weight of water.

Example V

*Polyamide from 4-ketopimelic acid, adipic acid and hexamethylenediamine.*—A mixture of 25 parts of the salt derived from 4-ketopimelic acid and hexamethylenediamine and 75 parts of the salt of adipic acid and hexamethylenediamine was sealed off in a reaction vessel under nitrogen and heated at 200° C. for 2 hours. The polymerization was completed by heating in vacuum at 240° C. for 2 hours. The polymer melted at 203–205° C., had an intrinsic viscosity of 0.72 (defined in Patent 2,130,948), and was easily spun and cold-drawn into strong fibers.

Example VI

*Polyamide from 6-ketohendecanedioic acid and hexamethylenediamine.* — 6-ketohendecanedioic acid was prepared by the hydration, decarboxylation and saponification of the acylethenone prepared from 4-carbomethyoxyvaleryl chloride by the method disclosed in application Serial No. 234,843, filed by J. C. Sauer, October 13, 1938. The salt of 6-ketohendecanedioic acid and hexamethylenediamine was prepared by mixing solutions of equivalent amounts in absolute alcohol, M. P. 158–160° C. A portion of this salt was heated under nitrogen in a sealed tube at 245° C. for 1.5 hours. The polymerization was completed by heating at 255° C. for 1 hour at atmospheric pressure. The polymer was light-colored and tough, melting at 145° C. It had an intrinsic viscosity of .94. The polymer could be spun and cold-drawn to strong fibers. It could also be pressed into thin sheets possessing great toughness and strength.

Interpolyamides made from the above ingredients and containing proportions of hexamethylenediamine-adipic acid ingredients varying from 25% to 75% were prepared in a similar manner.

The product obtained with 25% of this ingredient had an intrinsic viscosity of .94, melted at 170° C., had fair cold drawing properties and yielded tough horny sheets. The product obtained with 50% of this diamine-dibasic acid salt had an intrinsic viscosity of 1.08, a melting point of 200° C., had good cold drawing properties and yielded tough sheets. The product obtained with 75% of this diamine-dibasic acid salt in the polyamide-forming composition had an intrinsic viscosity of 1.11, a melting point of 220° C., good cold drawing properties and yielded tough and pliable sheets.

Example VII

*Polyamide from 4-ketopimelic acid, adipic acid, hexamethylenediamine and triglycoldiamine.*—A mixture of 0.5 part of the salt of 4-ketopimelic acid and triglycoldiamine; 1.0 part of the salt of adipic acid and hexamethylenediamine, and 8.5 parts of the salt of adipic acid and triglycoldiamine was heated in a sealed tube under nitrogen for 3 hours at 220° C., at 256° C. for 2 hours at atmospheric pressure, and at 256° C. for one hour under vacuum. The product could be spun and cold-drawn to strong fibers and cast into tough, transparent films. It melted at 175° C. It was found that 100 parts of the polymer would absorb 130 parts of water and that 60 parts of polymer would dissolve in 100 parts of water at room temperature The reaction in the foregoing examples can also be carried out in the presence of an inert solvent of which monohydric phenols, e. g., phenol, cresols, xylenols, and hydroxydiphenyls, are especially useful. Inert nonsolvents such as hydrocarbons, e. g., white medicinal oil and chlorinated hydrocarbons may be used. When easily volatile reactants are employed, it is desirable to carry out at least the initial stage of the reaction in a closed vessel or under reflux to prevent loss of reactants. The products of this invention are conveniently prepared in an open reactor equipped with a reflux condenser which permits the water or other by-products of the reaction to escape, but not the reactants or solvent. During the latter stages of the reaction, it is often desirable to decrease the pressure in order to complete the reaction and, if desired, to distill off the solvent. However, the products can be removed from the solvent by precipitation methods.

In preparing polyamides from diamines and dibasic acids it is often advantageous to prepare and isolate the intermediate salt. A very satisfactory method for insuring the formation of pure salt is to run together a solution of the diamine and a solution of the dibasic acid at such a rate that equimolecular quantities of diamine and dibasic acid are being brought together throughout the course of the mixing. Fairly pure salt can also be obtained by adding the entire quantity of one reactant to less than the chemically equivalent amount of the second reactant and then adding enough of the second reactant to bring the two reactants to equivalency. If one reactant is added portionwise to the entire quantity of the other reactant and precipitation of salt occurs before all the first mentioned reactant has been added, the salt will generally be heterogeneous in that it will be contaminated with the reactant present in excess at the time of precipitation.

All examples illustrate the preparation of polyamides containing ketone groups. In addition Examples III, IV, and VII illustrate polyamides derived from polyamide-forming ingredients containing hetero-atoms in addition to a ketone group. Additional examples of dibasic acids (or amide-forming derivatives thereof) containing ketone groups are mesoxalic acid, diketosebacic acid, benzophenonedicarboxylic acid, acetophenone-3,5-dicarboxylic acid, cyclohexanonedicarboxylic acid, oxalacetic acid, benzanthronedicarboxylic acid, and ketopinic acid. These acids or their amide-forming derivatives may be condensed with diamines of which the following are illustrative: tetramethylenediamine pentamethylenediamine, hexamethylenediamine, decamethylenediamine, 3-methyl-1,6-diaminohexane, 2,5-dimethyl-1,6-diaminohexane, m-phenylenediamine, triglycoldiamine, tetraglycoldiamine, piperazine, and N,N'-dimethylhexamethylenediamine. The products of this invention are also prepared by reacting diamines containing ketone groups, e. g., 1,11-diamine-6-ketohenedecane, 3,5-diaminoacetophenone, diaminotetralone, and 1,5-diamino-3-pentanone, with dibasic acids such as carbonic, oxalic, maleic, fumaric, glutaric, adipic, β-methyladipic, β-phenyladipic, α,α'-dimethyladipic, pimelic, suberic, azelaic, sebacic, terephthalic, isophthalic, diglycolic, 4-ketopimelic acid, and diphenylolpropanediacetic acid. Examples of suitable amino acids containing ketone groups are β(3-aminobenzoyl-propionic acid and 4-(3-aminobenzoyl) benzoic acid.

The products of this invention may be made from the above mentioned polyamide-forming reactants only or from such reactants in admixture with other linear polymer-forming reactants, e. g., hydroxy acids and glycols.

It is evident from the foregoing that many combinations of reactants are possible in the preparation of the polyamides of this invention. Further combinations are possible by reacting one or more diamines with one or more dicarboxylic acids, at least one of which contains a ketone group. Similarly, interpolymers can be prepared from the reaction of one or more monoaminomonocarboxylic acids with diamine-dibasic acid mixtures in which at least one reactant contains a ketone group. Moreover, it is within the scope of this invention to mix preformed polyamides at least one of which is derived from a polyamide-forming reactant containing a ketone group. The products of this invention can also be mixed with other polymers, e. g., with the fiber-forming polymers described in the above mentioned patents. Thus, it is possible to add substantial amounts of a polyamide containing a ketone group to a superpolyamide, e. g., polyhexamethyleneadipamide, and obtain a product whose properties closely resemble those of the unmodified superpolyamide; the mixed polymer can be spun from melt into filaments capable of being cold-drawn into oriented fibers.

In the polyamides of this invention the ketone group appears in the divalent, organic radicals separating the recurring amide groups in the polymer molecules. The position of the ketone group and the order and frequency of its occurrence in the polymer molecule are dependent upon the reactants used in the preparation of the polymer. If the polyamide is obtained exclusively from a polymerizable monoaminomonocarboxylic acid, $NH_2RCOOH$, in which R is a divalent organic radical containing a ketone group, then the ketone group will be present in each recurring unit (—NHRCO—) in the polyamide. If the polymer is derived from a mixture of polymerizable amino acids only one of which contains a ketone group, the ketone group will appear less frequently in the polymer molecule. It is evident that several types of polyamides of the diamine-dibasic acid type containing ketone groups can be prepared; for example, those in which the diamine ($NH_2R'NH_2$) represented contains a ketone group, those in which the dibasic acid (HOOCR''COOH) contains a ketone group, and those in which both the amine and acid contain a ketone group. In the formulae, R' and R'' represent divalent organic radicals containing a ketone group. It will be apparent from the above description that at least one of the reactants used in the preparation of the products of this invention has the formula XR'''Y, in which X and Y represent amide-forming groups, and R''' represents a divalent organic radical containing a ketone group. On hydrolysis with strong mineral acids, e. g. hydrochloric acid, the products of this invention yield the reactants from which they were obtained or are obtainable, the amino constituents being obtained in the form of their mineral acid salts.

The polyamides of this invention are in some instances fiber-forming but for the most part they are resinous. The fiber-forming polyamides are best obtained when the ketone group of the polyamide-forming reactant is removed by at least four chain atoms from a carboxyl group, and by at least five chain atoms from an amino group. If the ketone group is closer than this to the amide-forming groups, it is advisable to use in admixture with the polyamide-forming ingredients containing such a ketone group relatively large proportions of other polyamide-forming ingredients known to give fiber-forming products, such as hexamethylene-diammonium adipate, in order to obtain fiber-forming products. (Cf. Examples V, VI and VII.)

The resinous products are soluble in a wide range of organic solvents and are of lower melting point than the polyamides described in the above mentioned patents which are high melting products insoluble in most organic solvents with the exception of phenols, and certain acids. For this reason the present products are better adapted to the preparation of coating, impregnating, sizing adhesive and molding compositions than those described in the aforementioned patents. These resinous polyamides may also be used in the preparation of fibers, but for this purpose it is generally desirable to prepare the polyamides in the presence of polyamide-forming reactants which yield superpolymers, or to incorporate these polyamides with a fiber-forming ingredient such as a cellulose derivative or a fiber-forming polymer of the types described in the previously mentioned patents. In these various applications the products may be mixed with one or another or with other agents, such as plasticizers, resins, cellulose derivatives, pigments, fillers, dyes, and the like.

An important feature of the products of this invention resides in the fact that the presence of the ketone group in the polyamide molecule renders the molecule susceptible to further modifications by materials such as hydroxylamine, semicarbazide, hydrazine and other reagents capable of reacting with a ketone group. By this means further new and useful products are obtained.

As many apparently widely different embodiments of this invention may be made without departing from the spirit and scope thereof, it is to be understood that I do not limit myself to the specific embodiments thereof except as defined in the appended claims.

I claim:

1. A resinous polyamide which yields continuous solid films and which comprises the product obtained by heating to polymerizing temperature a composition consisting essentially of bifunctional polyamide-forming material which provides complementary amide-forming groups and which comprises a reactant containing a ketone group in the chain of atoms separating its amide-forming groups.

2. A resinous polyamide which yields continuous solid films and which comprises the reaction product obtained by heating to polymerizing temperature a composition consisting essentially of bifunctional polyamide-forming material which comprises a monoaminomonocarboxylic acid of the formula $NH_2RCOOH$ in which R is a divalent organic radical having a chain of atoms at least one of which is the carbon atom of a carbonyl group.

3. A resinous polyamide which yields continuous solid films and which comprises the product obtained by heating to polymerizing temperature a composition consisting essentially of bifunctional polyamide-forming material which comprises equimolecular proportions of a diamine of the formula $NH_2R'NH_2$ and a dibasic acid of the formula $HOOCR''COOH$, $R'$ and $R''$ in said formulae being divalent organic radicals at least one of which has a chain of atoms in which at least one is the carbon atom of a carbonyl group.

4. A process which comprises heating to polymerizing temperature until a resinous polymeric film-forming product is obtained a composition consisting essentially of bifunctional polyamide-forming material which provides complementary amide-forming groups and which comprises a reactant containing a ketone group in the chain of atoms separating its amide-forming groups.

5. A process which comprises heating to polymerizing temperature until a resinous polymeric film-forming product is obtained a composition consisting essentially of bifunctional polyamide-forming material which comprises a monoaminomonocarboxylic acid of the formula $NH_2RCOOH$ in which R is a divalent organic radical having a chain of atoms at least one of which is the carbon atom of a carbonyl group.

6. A process which comprises heating to polymerizing temperature until a resinous polymeric film-forming product is obtained substantially equimolecular proportions of a diamine of the formula $NH_2R'NH_2$ and a dibasic acid of the formula $HOOCR''COOH$, $R''$ and $R'$ in said formulae being divalent organic radicals at least one of which has a chain of atoms in which at least one is the carbon atom of a carbonyl group.

RALPH A. JACOBSON.